United States Patent [19]
Gensini et al.

[11] Patent Number: 5,850,413
[45] Date of Patent: Dec. 15, 1998

[54] DEVICE TO SUPPORT AND SWING THE HEARTH IN AN ELECTRIC FURNACE

[75] Inventors: Gianni Gensini, Buia; Daniele Merlino, Murozzo; Angelico Della Negra, Povoletto, all of Italy

[73] Assignee: Dianeli & Co. Officine Meccaniche, Buttrio, Italy

[21] Appl. No.: 951,740

[22] Filed: Oct. 16, 1997

[30] Foreign Application Priority Data

Oct. 21, 1996 [IT] Italy .................................. UD96A0201

[51] Int. Cl.⁶ ...................................................... F27B 14/02
[52] U.S. Cl. ................................... 373/84; 373/72; 373/86
[58] Field of Search ................................. 373/71, 72, 76, 373/79, 83, 84, 86; 266/45, 236, 240

[56] References Cited

U.S. PATENT DOCUMENTS

| | | | |
|---|---|---|---|
| 980,345 | 1/1911 | Ruthenburg | 373/79 |
| 1,690,795 | 11/1928 | Sagramoso | 373/84 |
| 2,313,837 | 3/1943 | Nissim | 373/84 |
| 3,035,106 | 5/1962 | Mercier | 373/84 |
| 3,358,978 | 12/1967 | Lambrecht et al. | 373/64 |
| 3,835,231 | 9/1974 | Marchner | 373/84 |
| 4,468,781 | 8/1984 | Buhler | 373/84 |

FOREIGN PATENT DOCUMENTS

| | | |
|---|---|---|
| 0420776 | 4/1991 | European Pat. Off. . |
| 1456260 | 1/1967 | France . |
| 1458910 | 5/1969 | Germany . |
| 1508302 | 10/1969 | Germany . |
| 3419030 | 5/1985 | Germany . |
| 42829 | 3/1963 | Luxembourg . |
| 9113305 | 9/1991 | WIPO . |

Primary Examiner—Tu Ba Hoang
Attorney, Agent, or Firm—Stevens, Davis, Miller & Mosher, L.L.P.

[57] ABSTRACT

Device to support and swing the hearth in an electric furnace, whether it be the type operating on direct or alternate current, the furnace being able to be of the channel type, EBT with the hearth lowered or not, OBT or other type, the hearth (11) cooperating at the upper part with a cooled side wall (12) having a closure system (14) which can be temporally associated, the hearth (11) being supported by a platform (18), the device comprising a plurality of lifting cylinders (19, 119) associated at the lower part with the platform (18) and at least a translation and/or oscillation actuator (20, 120; 32) associated at the side of the platform (18), the lifting (19, 119) and translation (20, 120; 32) cylinders being able to be driven independently and in a correlated manner so as to obtain on the hearth (11) desired movements of lifting, translation, swinging, oscillation or a combination of such movements.

19 Claims, 4 Drawing Sheets

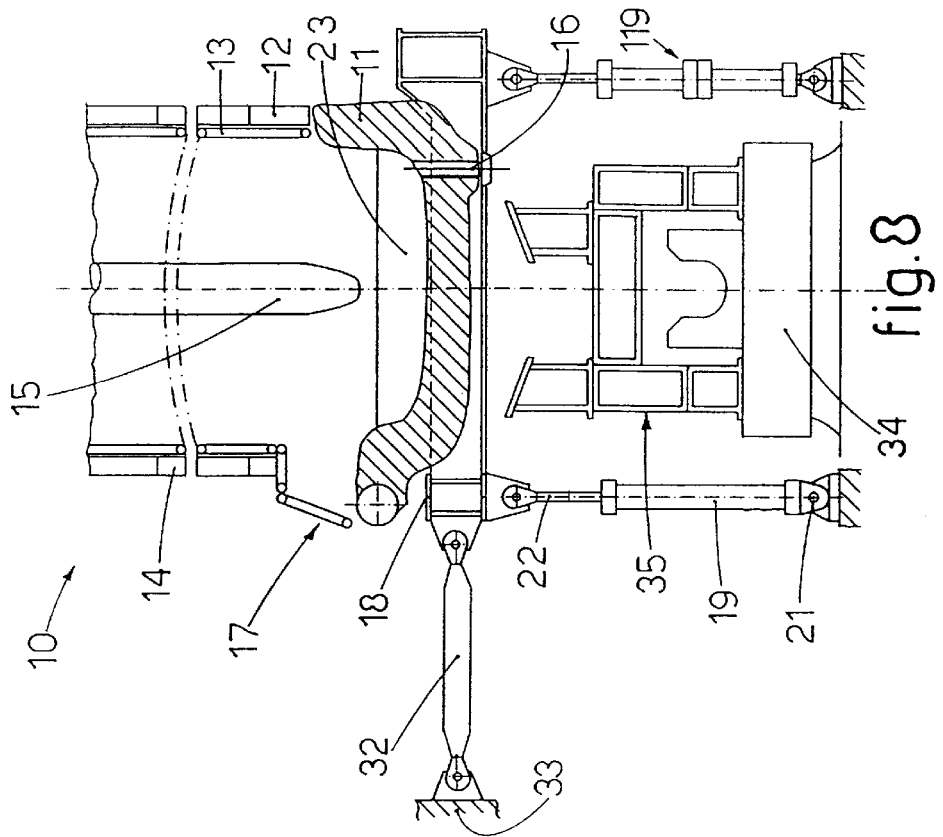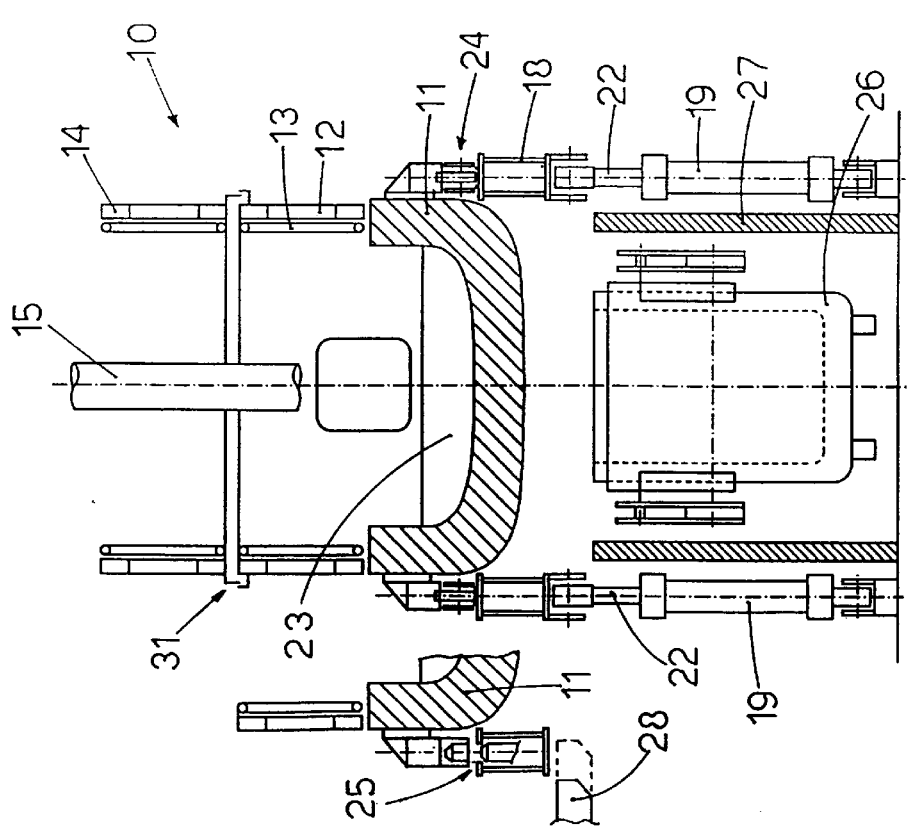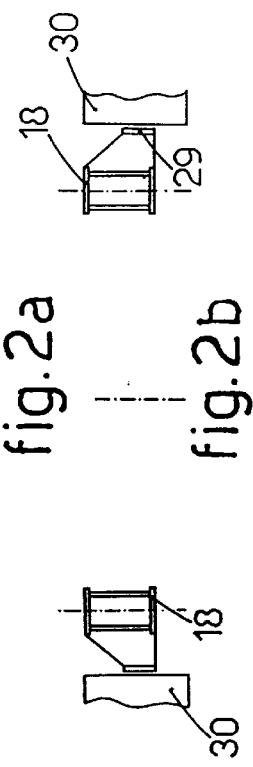

DEVICE TO SUPPORT AND SWING THE HEARTH IN AN ELECTRIC FURNACE

FIELD OF THE INVENTION

This invention concerns a device to support and swing the hearth in an electric furnace.

BACKGROUND OF THE INVENTION

To be more exact, the invention concerns a device which makes it possible, according to the various steps in the operating cycle of the furnace, to make the hearth carry out various movements of translation, oscillation or combinations thereof in order to facilitate and improve the execution of these steps. The invention is applied to any type of electric furnace, whether it operate in direct or alternate current, and whether it be of the channel type, Eccentric Bottom Tapping (EBT), Oval Bottom Tapping (OBT) or any other type.

The furnace to which this invention is applied may include covering systems with a traditional roof, or different systems, such as covering systems with different geometries, which can be disconnected and temporarily associated with the hearth, for example to permit different methods of loading, continuous or discontinuous.

The structure of an electric furnace used to melt metals normally includes a hearth made of or lined with refractory material inside which the molten metal is collected, and an upper portion which normally comprises a side wall with cooling panels and a covering roof which is also cooled.

The different steps of the melting cycle, such as loading, melting, carbon elimination, tapping, deslagging, etc., involve a plurality of operations and movements which have to be carried out on the furnace or its components; these operations make the execution of at least some of the steps complex and/or burdensome in terms of the time taken up, and/or risky for the safety of the workers. The maintenance and management operations of the furnace or of parts of the furnace, for example the hearth itself, are also very complex and cause long downtimes of the plant; moreover, these operations often involve the use of complex and bulky auxiliary equipment, to lift, translate, displace, etc.

To overcome the shortcomings of the state of the art, and to obtain a simple, economic, versatile solution, easy to install and maintain, the applicants have designed, tested and embodied this invention.

SUMMARY OF THE INVENTION

The purpose of the invention is to facilitate the execution and management of the main operations connected with the working and management or maintenance of an electric furnace used to melt metals.

To be more exact, the invention is intended to speed up and simplify the operations to move the hearth of the furnace, these operations being connected with loading, tapping, deslagging, and operations relating to the replacement and/or maintenance of the hearth or part thereof.

According to the invention, the platform on which the hearth rests is supported by a plurality of lifting cylinders, located at the lower part, and cooperates at the side with at least one translation cylinder, whose axis of drive is substantially parallel to the platform.

According to a variant, the platform cooperates laterally with at least one oscillation and/or swing element.

The combination of the actions of these various cylinders, of lifting and of translation, enables the hearth to make substantially any movement, to facilitate and accelerate the execution of the operations connected or auxiliary to the melting cycle.

The invention is designed to perform horizontal movements of the hearth, for example to load the hearth without moving the upper closed part, or to carry out maintenance operations or substitute the hearth itself; vertical movements, for example to connect the hearth to the upper closed portion, which can be temporarily associated; forward swinging motions, to encourage and accelerate tapping operations; backward swinging motions, to encourage and accelerate deslagging operations; or various combinations of movements, according to the various necessities of the plant or the process, for example oscillatory movements to encourage the homogenization and uniformity of the bath.

BRIEF DESCRIPTION OF THE DRAWINGS

The attached figures are given as a non-restrictive example, and show some preferred embodiments of the invention as follows:

FIG. 2a shows the transverse section of the furnace shown in FIG. 1 where the ladle to collect the molten metal discharged from the furnace is also shown;

FIG. 2b shows a detail of the invention;

FIGS. 7 and 8 show other possible embodiments of the invention.

DETAILED DESCRIPTION OF THE PREFERRED EMBODIMENTS

Figure 1:
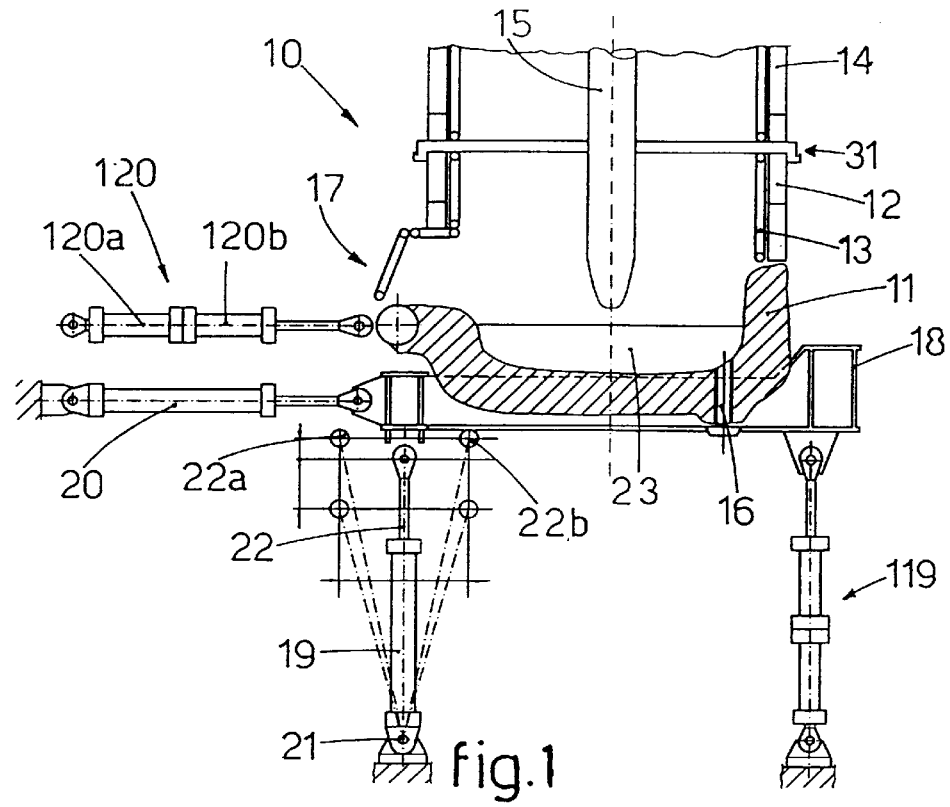
FIG. 1 shows a longitudinal section of an electric furnace including the device according to the invention.

The electric furnace 10 shown in FIG. 1 comprises a hearth 11 made of a refractory material at the upper part of which there is a side wall 12 including cooling panels 13 and closed at the upper part by a closure system 14 which is only partly shown here. Inside the furnace 10 the electrode 15 is located, or the electrodes 15 in the case of a furnace operating in alternate current.

The hearth 11 includes on the bottom a tapping hole 16 while on the side wall 12, in the upper part of the edge of the hearth 11, there is the deslagging door 17.

The hearth 11 rests on a platform 18 which is supported, in this case, by four hydraulic lifting cylinders 19, arranged symmetrically, and cooperates at the side with at least a translation cylinder 20, which has its axis of drive substantially parallel to the plane defined by the platform 18. The side wall 12 can be associated temporally in such a way as to seal with the closure system 14 by means of a joint 31 which can be disconnected rapidly for the translation and swinging operations of the hearth 11, for example a sand joint or some other type of analogous connection.

In this case (FIG. 2), the hearth 11 moves in relation to the platform 18 on sliding means 24 such as a rollerway, wheel units or analogous means. This displacement of the hearth 11 in relation to the platform 18 is obtained by means of drawing winches or analogous systems which are not shown here.

The hearth 11 is translated in particular situations, for maintenance operations or to replace the hearth or to load the basket with scrap and/or other specific operations.

FIG. 1 shows a variant where the translation cylinder 120, an alternative to the cylinder 20, is a double opposed cylinder to define with precision the central position which corresponds, as in the case shown in the Figure, with a completely closed cylinder 120b and with a completely open cylinder 120b, at the same time reducing the travel of the individual cylinders 120a, 120b.

One or more of the vertical lifting cylinders, such as the cylinders 119, can also be of the double opposed cylinder type.

Figure 5:
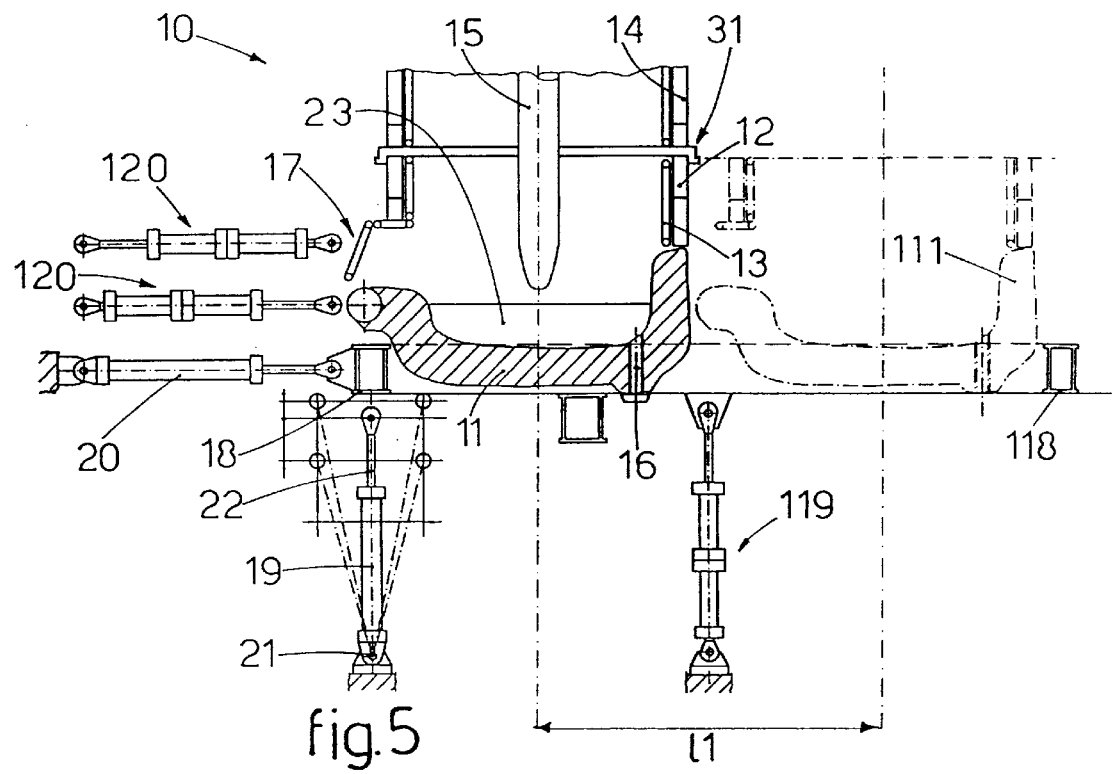
FIG. 5 shows a variant of FIG. 1 with a lengthened platform.

FIG. 5 shows two possible configurations of the cylinders 120 of the double cylinder type.

By acting in combination on the vertical lifting cylinders 19,119 and the horizontal translation cylinders 20,120, it is possible to carry out a plurality of movements of the hearth 11 in order to perform lifting movements, translations, swinging movements in one direction or another, or any other movement which derives from the combination of these elementary movements.

For example, the simultaneous movement to the same extent of the four lifting cylinders 19, 119 causes a vertical movement and keeps the hearth 11 and the platform 18 horizontal.

By acting on the cylinders 19, 119 in pairs, it is possible to perform movements of the hearth 11 and the platform 18 in relation to the longitudinal axis of the furnace 10.

By acting on the individual cylinders 19, 119 individually and in a differentiated manner, it is possible to obtain movements for every type of functional and operational requirement.

These actions make it possible to position the deslagging door 17 the casting hole 16 in different positions in relation to the position on the longitudinal axis of the furnace 10; it is thus possible to locate them in any position along the 360° of the furnace 10.

In FIG. 1, the oscillation of the hydraulic cylinder 19 on its pin 21, together with the action of the relative piston 22, makes it possible to perform forward swinging movements, when the piston moves to position 22a, in order to tap the liquid metal through the hole 16, or backward swinging movements, when the piston moves to position 22b, to discharge the slag through the deslagging door 17.

A combined action of the horizontal translation cylinders 20, 120 can encourage and accelerate these tapping and deslagging operations.

In this case, for safety reasons, in the working position assumed by the furnace 10 during the normal melting cycle, there is a device 25 to clamp the hearth 11 to the platform 18 which guarantees its stable position and prevents possible unwanted movements which might lead to operating problems and irregularities.

FIG. 2 also shows the ladle 26 inside which the molten metal is discharged from the hearth 11; the ladle 26 can be located even in a different position from that of the hearth 11 during the actual melting cycle, after which the hearth 11 is moved to the appropriate position above the ladle 26 for the tapping to be carried out.

The lifting cylinders 19 are protected by the appropriate protection barriers 27 which prevent any impacts or shocks, for example during the movement of the ladle 26.

There is also a clamping device 28 which defines the correct horizontal position of the platform 18 in order to prevent the platform 18 from tilting. In this case, the platform 18 has anti-slip pads 29 at the sides which cooperate with walls 30 to prevent the platform 18 from oscillating during the swinging movements of the hearth 11.

Figure 3:
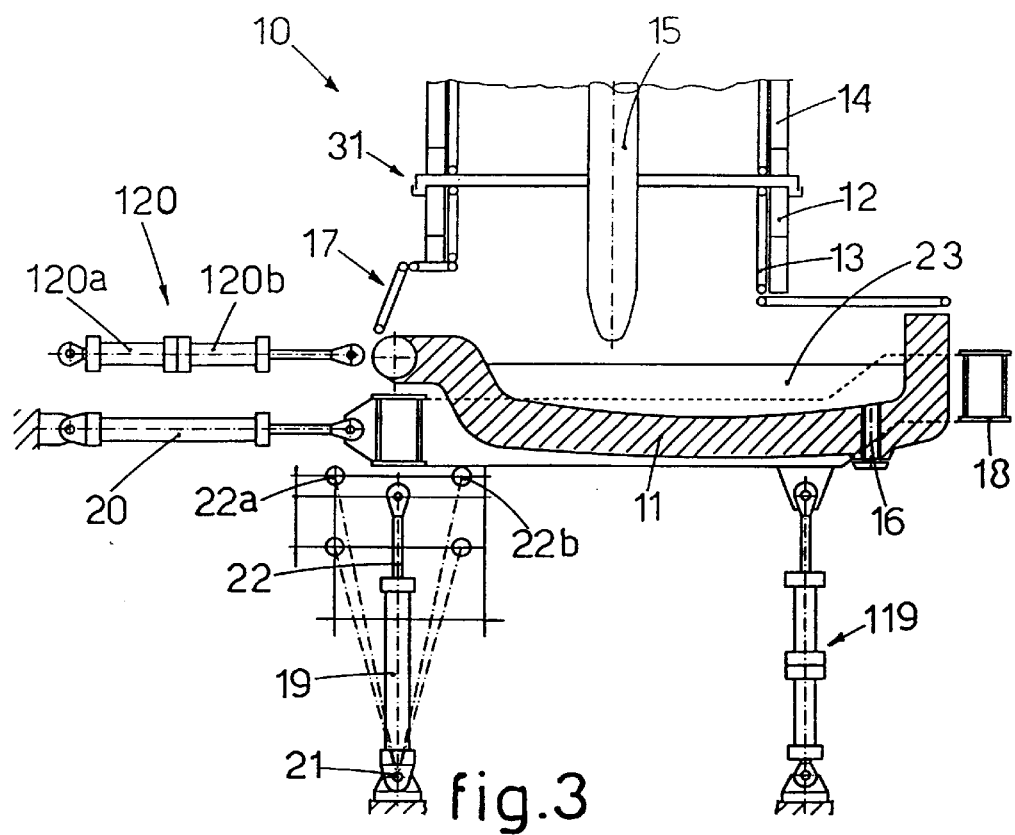
FIG. 3 shows the longitudinal section of a furnace of the EBT type adopting the device according to the invention.
Figure 4:
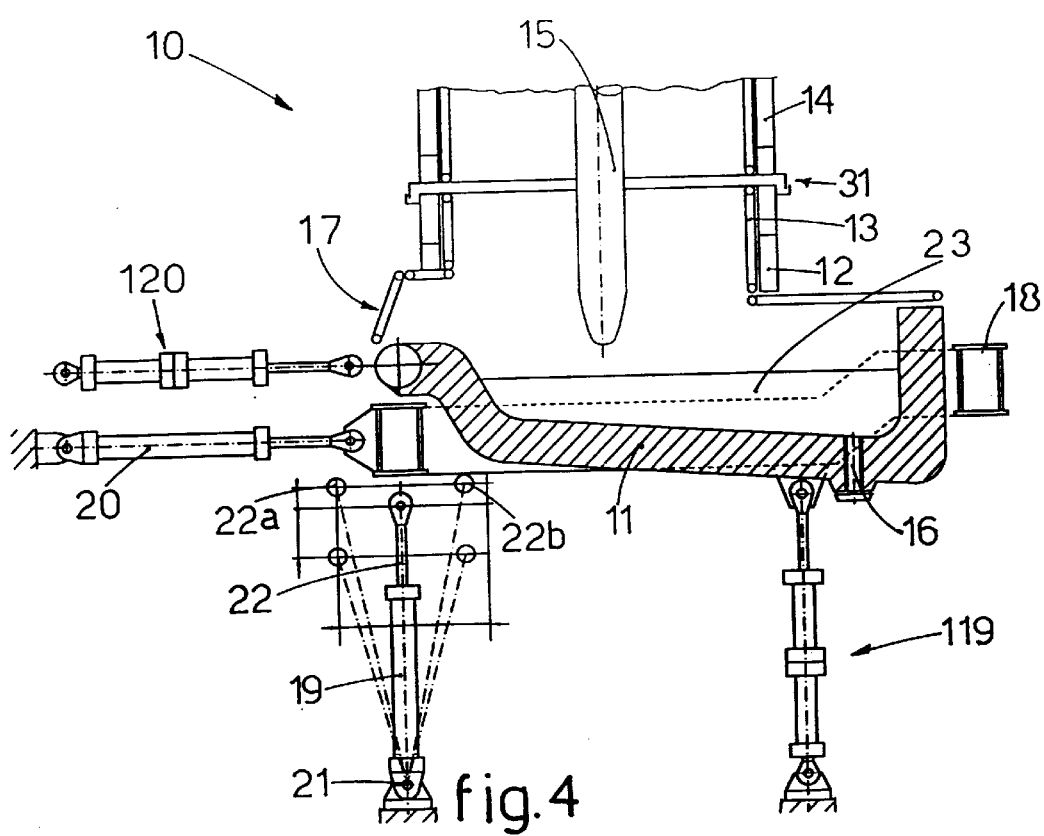
FIG. 4 shows a variant of FIG. 3 with an EBT furnace of the lowered type.

The variant shown in FIG. 3 refers to a furnace with a hearth 11 of the EBT type, while in the variant shown in FIG. 4 the hearth 11 is lowered to facilitate the casting operations from the tapping hole 16.

FIG. 5 shows the embodiment which uses an elongated platform 118 which makes it possible to translate the hearth 11 horizontally by one travel "11" in order to carry out, for example, loading with a basket of scrap, or for necessities of maintenance or management or again to substitute the hearth 11 or part thereof. The translated position of the hearth 11 is shown by a line of dots and dashes 111 in FIG. 5.

Figure 6:
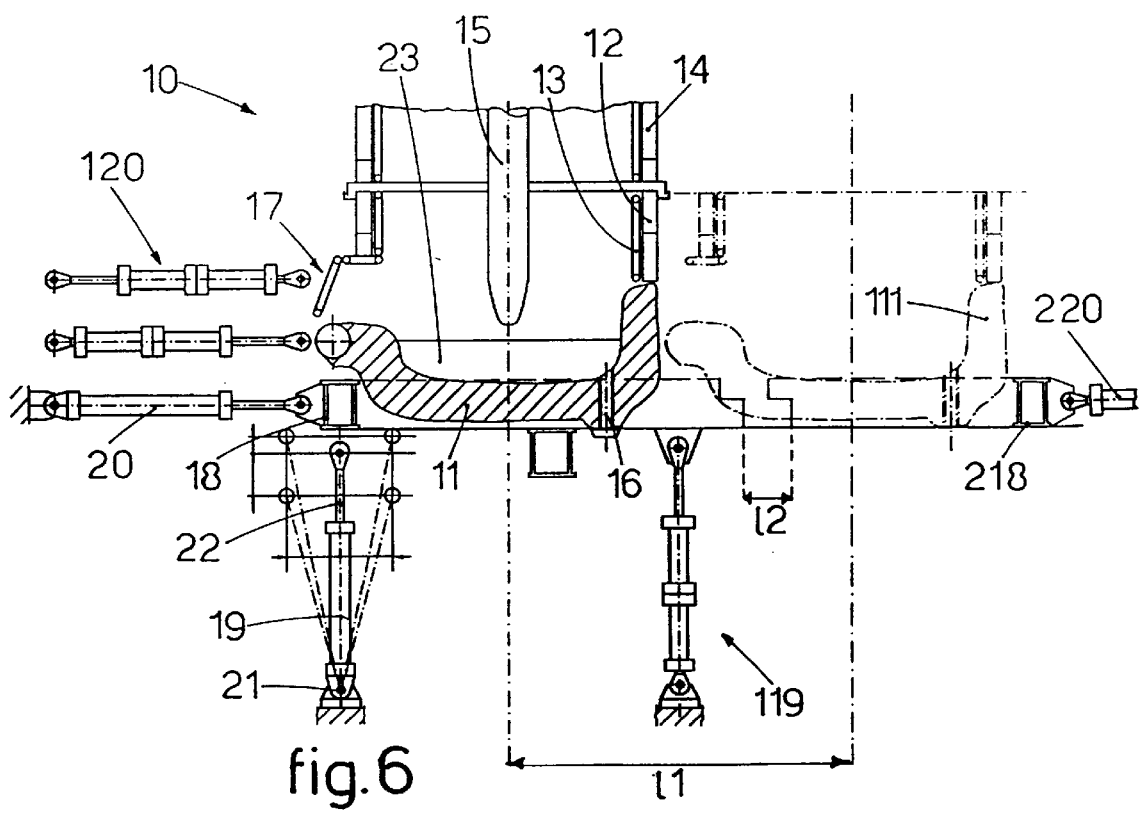
FIG. 6 shows a variant of FIG. 5.

In the further embodiment of FIG. 6, in order to permit the horizontal translation of the hearth 11 for the abovementioned necessities, the platform 18 is flanked by an addition 218, driven along a travel "12" by an autonomous cylinder 220, so as to define an elongated supporting platform for the hearth 11 in its horizontally translated position.

Figure 7:
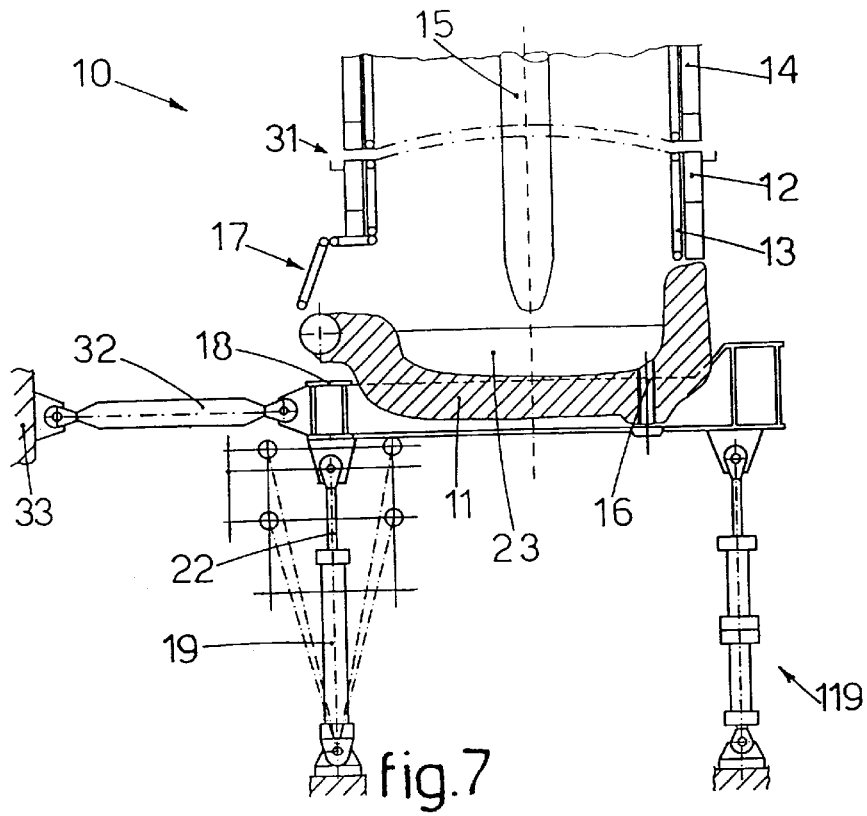

In the variant shown in FIG. 7, the horizontal drive cylinder is replaced by a connecting rod element 32 of the appropriate size and rigidly anchored at one end to the wall 33 and anchored to oscillate at the other end to the platform 18.

The oscillation of this connecting rod element 32 achieves the desired swinging movements of the platform 18 and therefore the hearth 11 according to need.

In this case, the upper part of the side wall 12 and the lower part of the upper portion 14 have an arched mating shape so as to allow reciprocal sliding during the oscillatory and swinging movements.

According to the further embodiment shown in FIG. 8, the hearth 11 cooperates with a translation trolley 34, for example the same trolley used to move the ladle 26, when the platform 18 is lowered and the hearth 11 is deposited on a supporting frame 35; in this way, by releasing the hearth 11 and the platform 18 from each other, it is possible to discharge the hearth 11 from the open side of the platform 18; it is therefore possible to include on the structure above the furnace a bridge crane which only has to lift the full ladle 26, or the basket of scrap, thus reducing the capacity required of the bridge crane itself.

We claim:

1. A device to support and swing a hearth in an electric furnace, an upper part of the hearth (11) being configured to cooperate in temporary association with a cooled side wall (12) and with a closure system (14), comprising:

a platform (18) for supporting the hearth (11), a plurality of lifting cylinders (19, 119) associated with a lower part of the platform (18) and at least one translation and oscillation actuator (20, 120; 32) comprising at least one translation cylinder (20, 120; 32) associated at a side of the platform (18), the lifting cylinders (19, 119) and the at least one translation cylinder (20, 120; 32) being for driving independently and together to obtain on the hearth (11) desired movements of lifting, translation, swinging, oscillation or a combination of such movements.

2. The device as in claim 1, wherein the translation and/or oscillation actuator comprises at least a horizontal translation cylinder (20, 120) with its axis of drive substantially parallel to the platform (18).

3. The device as in claim 1, wherein the translation and/or oscillation actuator comprises at least a connecting rod element (32) one end of which is anchored by one side to the platform (18).

4. The device as in claim 1, wherein the platform comprises means for releasably centering and clamping (25) the hearth (11) in relation to the platform (18).

5. An apparatus comprising the device, the hearth (11), the cooled side wall (12) and the closure system (14) as in claim 1, wherein between the cooled side wall (12) and the closure system (14) there is a sand joint (31) which can be temporarily disconnected.

6. The apparatus as in claim 5, wherein the area of contact between the side wall (12) and the closure system (14) is at least partly arched.

7. The device as in claim 1, wherein the hearth (11) has sliding means (24) in relation to the platform (18).

8. The device as in claim 1, wherein at least one member of the group consisting of at least one of said lifting cylinders (119) and at least one said translation cylinder (120) are a double opposed cylinder.

9. The device as in claim 1, which includes barrier-type protection means (27) at least for the lifting cylinders (19, 119).

10. The device as in claim 1, which includes clamping means (28) in the horizontal position of the platform (18).

11. The device as in claim 1, wherein the platform (18) includes anti-slip pads (29) cooperating with stationary side walls (30).

12. The device as in claim 1, wherein the platform (18) is of the elongated type (118) so as to cover at least one travel of horizontal translation "11" of the hearth (11) for loading operations, maintenance and/or replacement of the hearth (11) or parts thereof.

13. The device as in claim 1, wherein the platform (18) can be temporally associated with an adddition (218) to define an elongated platform (18) to support the hearth (11) in the horizontally translated position.

14. The device as in claim 1, which includes at least temporary support means (35) for the hearth (11) when it has been discharged from the platform (18), the support means being associated with moving means (34).

15. The device of claim 1, wherein the plurality of lifting cylinders suspend the platform in midair.

16. The device of claim 1, wherein said plurality of lifting cylinders is a plurality of substantially vertical lifting cylinders (19, 119), symmetrically disposed under said platform (18), each one of said vertical lifting cylinders (19, 119) having a first fixed end and a second end connected to said platform (18), and said at least one translation cylinder is at least one substantially horizontal actuator (20, 32, 120), having a first fixed end and a second end laterally connected to said platform (18), wherein the selected actuation of at least one of said vertical lifting cylinders (19, 119) in combination with the selected actuation of said horizontal actuator (20, 32, 120) causes the movement of said platform (18) and of the hearth (11) supported thereon by horizontally translating, vertically lifting, swinging on a longitudinal plane, oscillating on a transverse plane or any combination thereof.

17. The apparatus of claim 5, wherein the cooled sidewall swings with the hearth.

18. The apparatus of claim 5, wherein the hearth is selected from the group consisting of a channel hearth, an EBT hearth, and an OBT hearth.

19. The apparatus of claim 5, wherein the hearth is selected from the group consisting of a direct current hearth and an alternating current hearth.

* * * * *

UNITED STATES PATENT AND TRADEMARK OFFICE
CERTIFICATE OF CORRECTION

PATENT NO. : 5,850,413
DATED : December 15, 1998
INVENTOR(S) : GENSINI et al

It is certified that error appears in the above-identified patent and that said Letters Patent is hereby corrected as shown below:

On the title page item [73], change "Dianeli & C. Officine Meccaniche" to --Danieli & C. Officine Meccaniche--.

On the title page item [75], change "Murozzo" to --Moruzzo--.

Signed and Sealed this

Twenty-first Day of December, 1999

Attest:

Q. TODD DICKINSON

*Attesting Officer*          *Acting Commissioner of Patents and Trademarks*